US007137945B2

(12) United States Patent
Hughes (10) Patent No.: US 7,137,945 B2
(45) Date of Patent: Nov. 21, 2006

(54) UNDERGROUND TREATMENT OF BIOWASTE

(75) Inventor: W. James Hughes, Oklahoma City, OK (US)

(73) Assignee: Sunstone Corporation, Oklahoma City, OK (US)

( * ) Notice: Subject to any disclaimer, the term of this patent is extended or adjusted under 35 U.S.C. 154(b) by 0 days.

(21) Appl. No.: 11/295,775

(22) Filed: Dec. 8, 2005

(65) Prior Publication Data

US 2006/0074269 A1    Apr. 6, 2006

Related U.S. Application Data

(63) Continuation-in-part of application No. 10/917,282, filed on Aug. 13, 2004, now abandoned.

(51) Int. Cl.
*B09B 1/00* (2006.01)

(52) U.S. Cl. ..................................... 588/250
(58) Field of Classification Search ................ 588/250
See application file for complete search history.

(56) References Cited

U.S. PATENT DOCUMENTS

| | | | | |
|---|---|---|---|---|
| 3,335,798 A | * | 8/1967 | Querin et al. | 166/305.1 |
| 3,724,542 A | * | 4/1973 | Hamilton | 166/246 |
| 5,961,438 A | * | 10/1999 | Ballantine et al. | 588/250 |
| 6,216,463 B1 | * | 4/2001 | Stewart | 60/641.2 |
| 6,491,616 B1 | * | 12/2002 | Bruno et al. | 588/250 |

OTHER PUBLICATIONS

"Drilling Sideways—A review of horizontal Well technology and its domestic application" Apr. 1993, Energy Information Administration.*
"Underbalanced Drilling" Oct. 2002, High Arctic Well Control Inc.*

* cited by examiner

*Primary Examiner*—John Kreck
(74) *Attorney, Agent, or Firm*—William S. Dorman (57) ABSTRACT

A method of disposal of biowaste material which comprises drilling a first section of an injection well from the ground into a porous layer, drilling a second section of the injection well from a lower terminus of the first section of the injection well into the porous layer while drilling the same using underbalanced drilling techniques, drilling a first section of a production well from the ground to and into the porous layer, drilling a second section of the production well from the lower end of the first section thereof into the porous layer using underbalanced drilling conditions, making a geological measurement of the pore throat size and/or fracture aperture in the porous layer and treating the biowaste material introduced into the second section of the injection well by comminuting the same in a device such as a shear pump to an average particle size of approximately one-tenth to one-half, preferably one-seventh, of the average pore throat size in the porous layer, the measurement of the pore throat size and/or fracture aperture of the porous layer and the comminuting of the biowaste material being completed prior to the introduction of the biowaste material into the injection well.

7 Claims, 6 Drawing Sheets

UNDERGROUND TREATMENT OF BIOWASTE

This application is a continuation-in-part of prior application Ser. No. 10/917,282, filed Aug. 13, 2004; now abandoned, W. James Hughes, inventor; title the same as the instant application.

BACKGROUND OF THE INVENTION

1. Field of the Invention

The present invention relates to the disposal, by injection, of organic biowaste (such as raw municipal sewage, organic farm waste, and the like) into a suitable underground formation where the biowaste may degrade into methane and other gases. More particularly, the present invention involves the use of underbalanced drilling techniques and technology to drill the reservoir zone that is to be injected with the biowaste. The invention also includes pre-treatment of the biowaste material to insure that its particle size is smaller than the pore throat size and/or fracture aperture of the underground formation where it will be injected.

2. Prior Art

The prior art discloses methods of treatment of bio-waste wherein the biowaste is injected underground at a pressure sufficient to induce fracturing in the underground rock formation. The biowaste is injected into the rock fractures where any organic material degrades and any inorganic material is trapped within the rock matrix. Alternate methods described within the prior art include the following.

Hamilton U.S. Pat. No. 3,724,542 discloses a process of injecting biowaste in the form of "activated sludge" into existing wells in depleted hydrocarbon-bearing formations, such as oil shales or exhausted petroleum fields. This process requires the high-pressure fracturing of the shale in order to induce permeability for the sludge injection.

Bilak et al U.S. Pat. No. 6,002,063 discloses a method for creating a highly viscous slurry of biowaste or other disposables, then injecting the slurry into deeply buried strata, with the injection pressure being greater than or equal to the fracture or overburden pressure, i.e., far greater than the natural water pressure of the target strata.

Bruno et al U.S. Pat. No. 6,491,616 B2 discloses a method for creating a slurry of biosolids suitable for injecting, selecting an injection formation below a ground surface (preferably a natural gas formation in a gas accumulation zone), and injecting the biosolids slurry into the injection formation at a pressure sufficient to create and maintain fractures within the selected injection formation, to allow degradation of the injected biosolids slurry.

Chesner U.S. Pat. No. 5,139,365 discloses a process for injecting selected wastes (including organic biowaste) into the inherent void space found within municipal solid waste landfills. The process involves injecting the waste under high pressure to either permeate or compact the existing landfill components.

Alexander et al U.S. Pat. No. 5,734,988 discloses a method for disposal of oil field waste or any waste slurry stream by injection into underground formations that are preferably underpressured, highly permeable, highly porous, dipping in angle, and highly fractured. The injection slurry itself is overpressured compared to the formation, with the hydrostatic pressure head of the slurry column sufficient to induce injection.

The primary problem with these and other methods of drilling and biowaste injection is that overbalanced drilling procedures damage the structure of the receiving formation and reduces the formation's permeability during the drilling and completion process. For example, skin damage of the reservoir can occur when drilling overbalanced in a permeable reservoir, when the drilling mud which consists of very fine particles is pumped downhole to transport rock cuttings out of the hole being drilled actually filters into the formation as a filtrate (liquid) which leaves behind a filter cake, composed of the solids that were in the mud. (Skin damage is a measure of the reduction of a formation's permeability that is caused by drilling.) This filter cake plugs the formation and would inhibit future injectability of a biowaste slurry.

There are expensive and complicated completion methods generally understood and available to mitigate some of the challenges of drilling overbalanced, as listed above, but there is still much room for improvement in the field of drilling and injection of biowaste. The problem does not lie with the decomposition of biowaste into methane and other gasses, but rather with how the formation that is to receive the biowaste is drilled and how the biowaste is prepared.

SUMMARY OF INVENTION

An improved method is disclosed for injection of organic biowaste (such as raw municipal sewage, organic farm waste, and the like) into suitable underground formations, where the biowaste may degrade into methane and other gasses. The preferred embodiment provides for underbalanced drilling techniques to be applied for drilling the injection wells prior to underground injection of the biowaste. A further preferred embodiment provides for non-vertical or horizontal drilling and injection of the biowaste to fully exploit the permeability of naturally occurring pores and fractures in the rock formation. And a still further preferred embodiment provides for capturing the produced methane gas for use as fuel.

Underbalanced drilling is accomplished when the hydrostatic pressure exerted by the drilling fluid column is less than that exerted by the formation pressure at depth, as achieved through using drilling fluids of lower density than those used in traditional (overbalanced) drilling operations. In petroleum drilling operations, underbalanced drilling reduces wellbore damage because the flow is always in from the reservoir into the wellbore, which protects reservoir permeability by preventing solids from entering the reservoir thereby improving injectability. In the applied method for injection of biowaste into underground formations, the protected permeability will allow for increased quantities of biowaste material to be injected into the same well, thereby reducing the number of injection wells needed to dispose of large quantities of biowaste material.

Drilling horizontally (or non-vertically), brings the added benefit of encountering naturally occurring vertical fractures in the rock formation. These fractures present areas of much higher permeability than the standard rock matrix, and so will be able to accept an increased amount of injected biowaste.

After the desired geological strata has been selected and after the desired injection well has been drilled (using underbalanced drilling techniques), a sample is obtained of the material in the geological strata where the injection well has been drilled (unless this sample has been previously obtained). At this time, the biowaste material to be introduced in the injection well is comminuted in a shear pump or the like so the particle size of the biowaste material will be less than the pore throat size of the sample obtained from the porous layer. The particle size of the comminuted waste material should be in the range between one-tenth to one-half of the pore throat size and/or fracture aperture of the porous layer, preferably about one-seventh of the pore throat size. Thus, when the comminuted waste material is introduced into the injection well, where the particle size of the waste material is less than the pore throat size and/or fracture aperture of the porous layer, the absorption of the waste material into the porous layer will be essentially limitless.

DETAILED DESCRIPTION OF PREFERRED EMBODIMENTS

Figure 1:
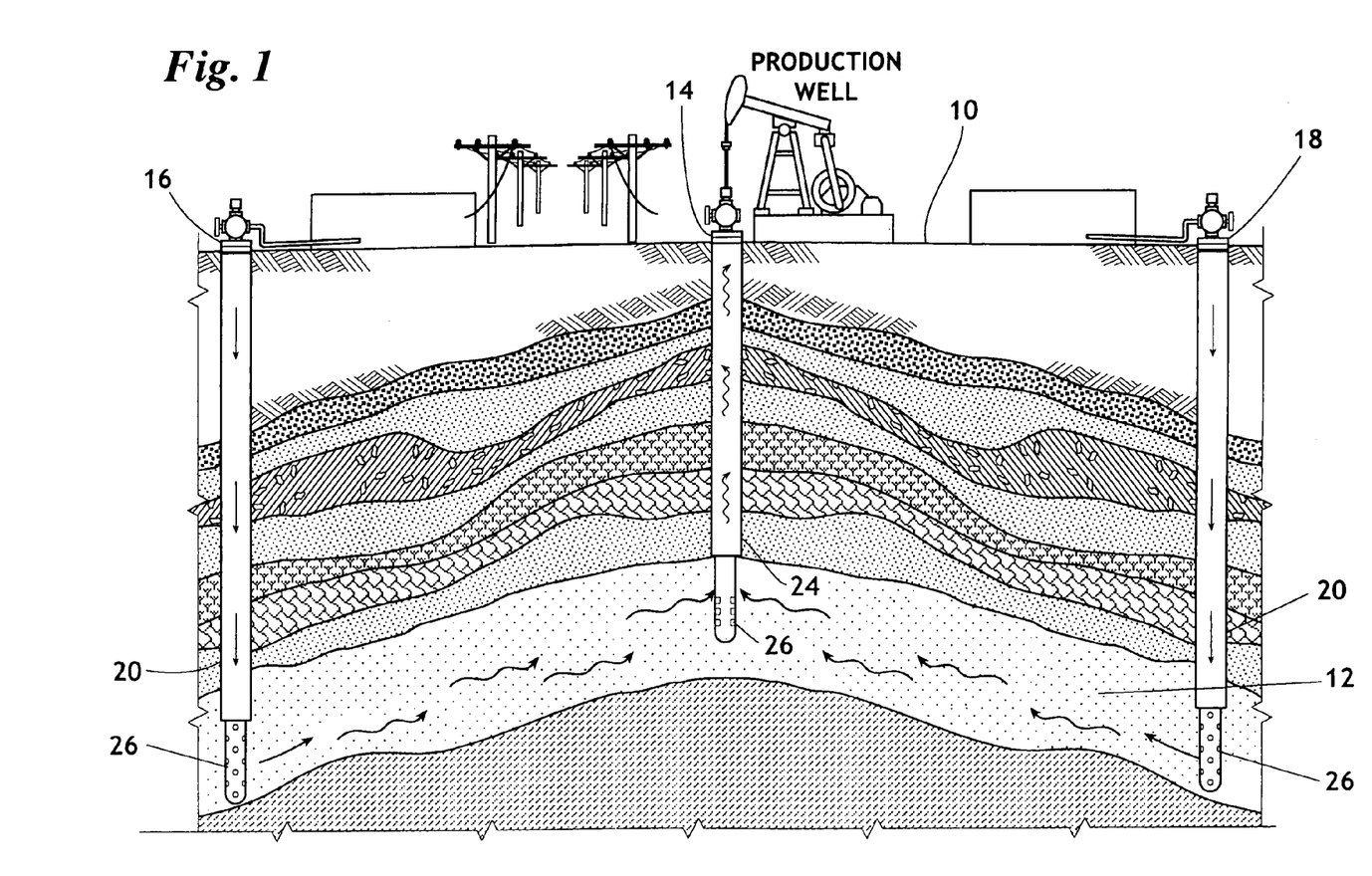
FIG. 1 is a semi-diagrammatic cross sectional view of underground strata showing a central producing gas well with two surrounding sewage injection wells.

Referring to the drawings in detail, FIG. 1 shows a semi-diagrammatical cross sectional view through a portion of the earth starting at ground level 10 and going down through a series of intermediate strata (not numbered) to a porous strata or layer 12. A central production well 14 is positioned to receive gases generated in the porous strata 12 as a result of the injection of waste material from two lateral injection wells 16 and 18. Each of the two injection wells 16 and 18 is drilled in two stages; that is, with respect to injection well 16, the upper portion of this well is drilled under overbalanced drilling conditions from the ground 10 to a location or level 19 within the porous layer 12 or as close to the top of the porous layer as possible. After the upper portions of the wells 16 and 18 are completed, they are provided with casings 23 which are suitably cemented in and which extend from the ground 10 to the levels 19 as indicated above; next, the lower portions of the wells 16 and 18 are drilled using underbalanced drilling conditions after which the lower portions of the wells are covered with porous liners 26 which extend from the top 19 of the lower section to the bottom 21 thereof. The production well is also drilled in two stages. The upper section of the well 14 is drilled under overbalanced drilling conditions from the ground 10 to the upper most portion of the layer 12 after which the well is suitably encased within the casing 24 which is suitably cemented therein. The second portion of the production well 14 is drilled under underbalanced drilling conditions after which it is encased within the porous liner 26 as shown.

The biowaste material 20 goes down the injection wells 16 and 18 through the porous liners 26 and into the porous layer 12 as indicated. When the biowaste material material is converted to gaseous material it passes, as the squiggly arrows 22, toward the porous adapter 26 at the bottom of the production well 14 and upwardly through the production well 14.

Figure 2:
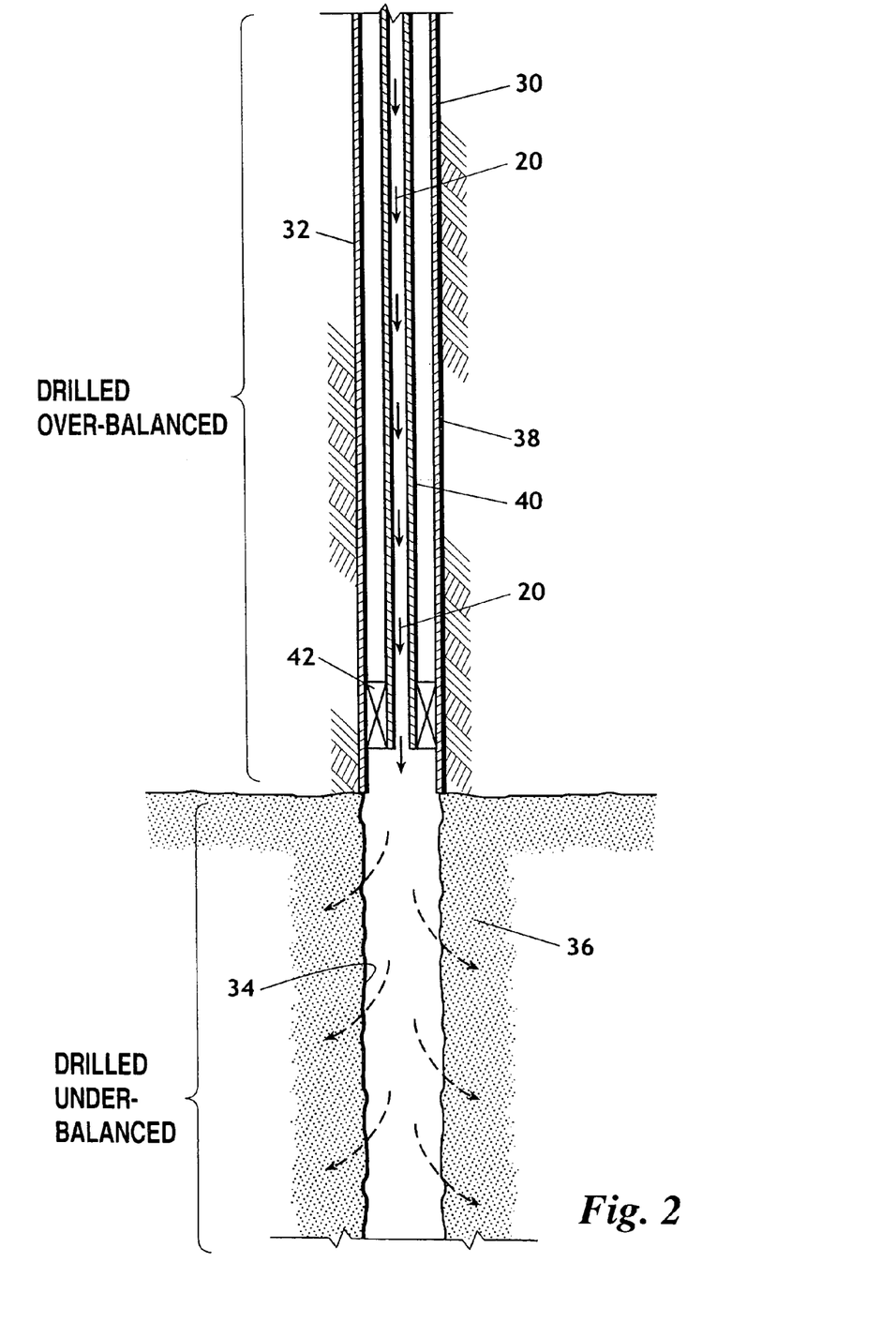
FIG. 2 shows a single vertical well which has been drilled in two stages, the upper section of the porous layer being drilled under over balanced conditions and the lower portions extending through the porous section being drilled under underbalanced conditions.

Referring now to FIG. 2, which represents an injection well 30, the upper portion 32 of the well has been drilled using overbalanced drilling conditions; i.e. where the pressure of the drilling mud is in excess of the pressure of the gases and fluids in the corresponding strata through which the upper portion 32 extends. The lower portion 34 of the well 30, however, must be drilled using underbalanced drilling conditions through the porous layer 36; i.e. the pressure of the drilling mud or drilling fluids (not shown) would be less than the pressure of the fluids or gases in the porous strata 36 during the drilling operations. The upper portion of the well is provided with an outer casing 38 and an inner casing 40 separated at its lower end from the outer casing 38 by a packer 42.

When the waste material 20 pass downwardly through the inner casing 40 into the lower portion 34 of the well bore, the waste material can pass into the porous layer 36.

Although not shown on FIG. 2, the waste material would have been comminuted in a shear pump or the like (not shown) so that its particle size was less than the pore throat size and/or fracture aperture of the porous layer 36. Obviously, a sample would have to have been taken from the porous layer 36 to determine the average pore throat size.

Figure 3:
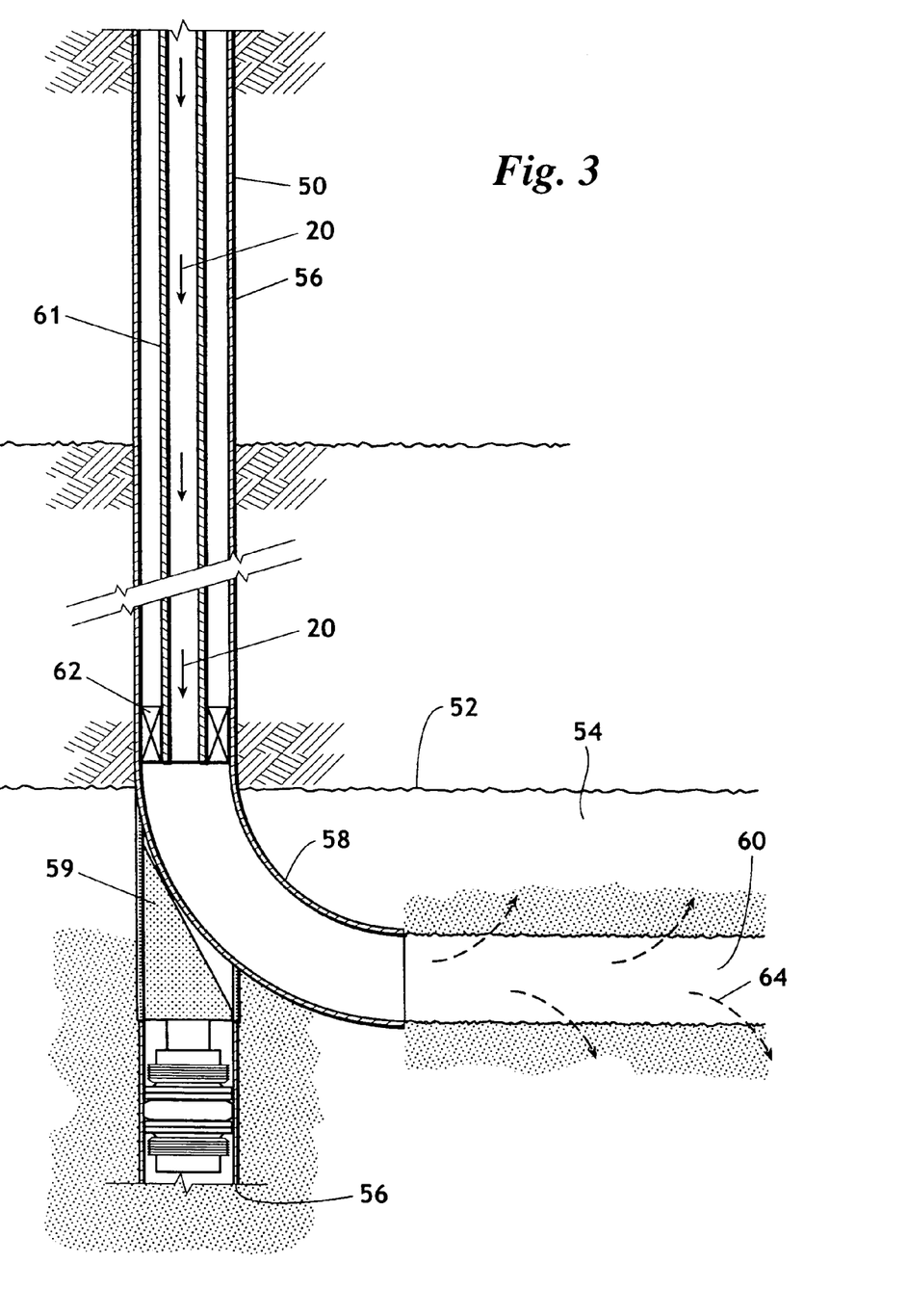
FIG. 3 is a view broadly similar to FIG. 2 but showing a situation where the lower drilled portion is horizontal and extending through the porous layer.

Referring now to FIG. 3, a vertical well 50 is provided having an upper portion extending down from the ground level (not shown) to a location 52 just above a porous strata 54. The upper portion of the well 50 consists of an outer casing 56 which connects with a lower elbow 58 extending into a horizontal well bore 60 which has been previously drilled horizontally under underbalanced drilling conditions. A portion of the well above the location 52 has been drilled previously under overbalanced drilling condition and down to a location 56 where an adapter 59 has been placed to permit the horizontal drilling of the horizontal well bore 60. The upper portion of the well 50 also includes an inner casing 61 which is separated at its lower end from the outer casing by means of a packer 62. The waste material passes through the center of the inner casing 61 down to the elbow 58 and into the horizontal well bore 60. As in the case of FIG. 2, the average pore throat size and/or fracture aperture of the porous layer 54 will have been determined in advance and the waste material passing through the center of the inner casing 61 will have been treated previously in a shear pump or the like to ensure that the particle size of the waste material is less than the pore throat size of the porous layer 54.

Under these conditions, the material passing into the horizontal well bore 60 will freely pass into porous layer 56 as indicated by the dotted line arrows 64.

Figure 4:
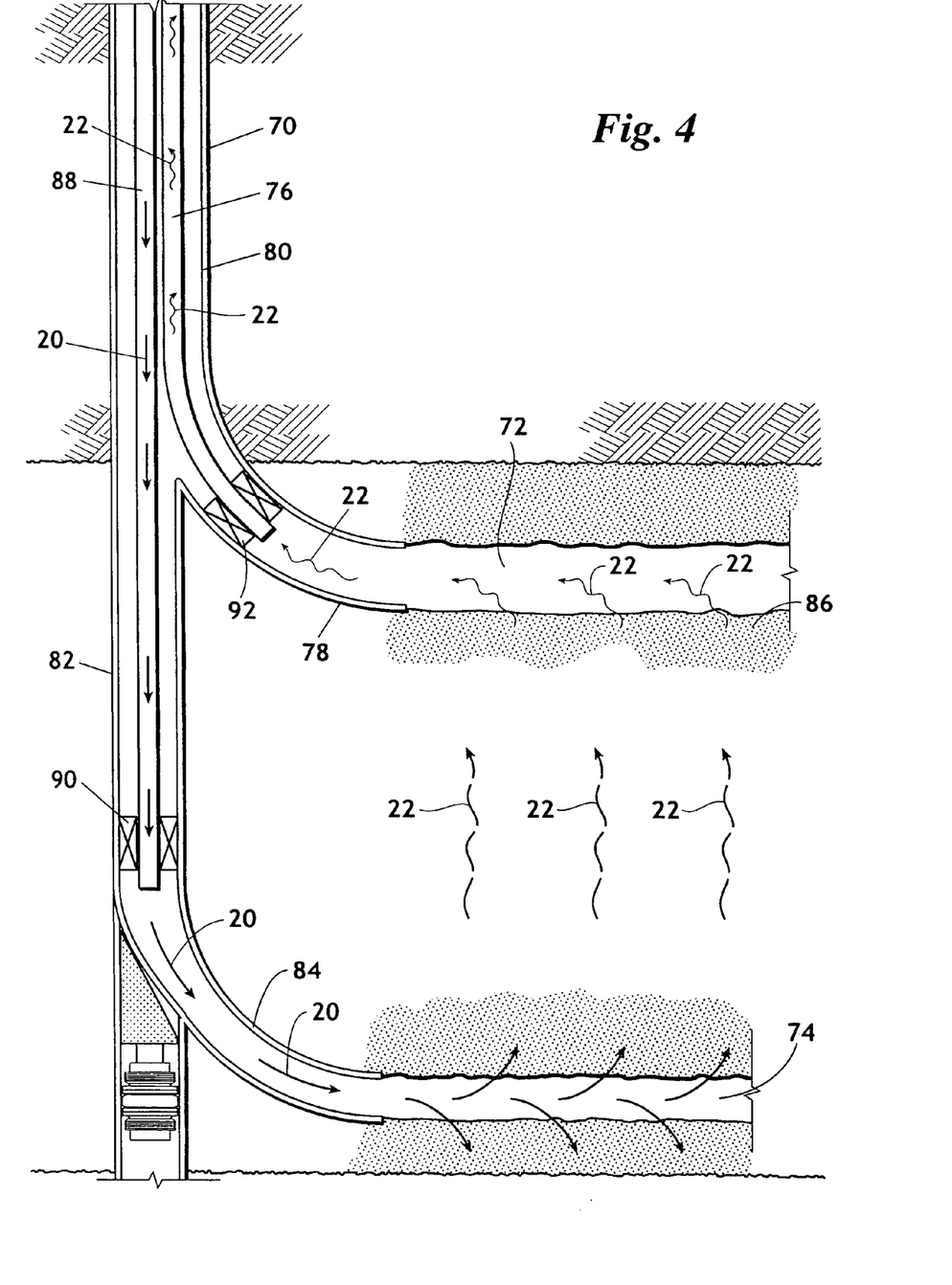
FIG. 4 is a view similar to FIG. 3 showing an upper vertical well portion located above the porous layer and drilled under overbalanced conditions and extending downwardly into two parallel, upper and lower, horizontal wells or laterals which are drilled using underbalanced drilling conditions; the lower lateral being designed to receive the sewage and the upper lateral being designed to receive gas which percolates up through the porous layer.

Turning now to FIG. 4, this embodiment shows a vertical well 70 connecting with two horizontal wells 72 and 74. The vertical well 70 will have been provided with a means for diverting to one side to produce the upper horizontal well bore 72 using underbalanced drilling techniques.

Thus, the intermediate portion of the vertical well connects with an elbow 78 which extends to the entrance to the horizontal bore 72. The vertical well bore is provided with an outer casing 80 which connects with the elbow 78 and also with a lower vertical extension of this casing 82. The lower most portion of the extension casing connects with an elbow 84 which extends into the entrance of the lower horizontal well bore 74. The porous strata 86 extends between and above and below the horizontal well bores 72 and 74. It should be understood that well bore 74 has also been drilled previously using underbalanced drilling techniques. An inner smaller casing 88 extends downwardly through the outer casing 80 to a location just above the lower elbow 84 and separated from the extension casing by means of a packer 90. Another inner small casing 76 extends from the surface or ground level (not shown) to the interior of the elbow 78 and is separated therefrom by means of a packer 92. It should be understood that the waste material 20 which passes downwardly through the smaller casing 88 and into the lower horizontal well bore 74 has been comminuted previously using a shear pump or the like (not shown) so that the particle size of the waste material is less than the pore throat size and/or fracture aperture of the porous layer 86. Of course, a geological sample of the porous layer 86 will have been obtained previously to measure the pore throat size of the porous layer so as to determine the degree of comminution required. The particle size of the comminuted waste material should be in the range between one-tenth to one-half of the pore throat size and/or fracture aperture of the porous layer, preferably about one-seventh of the pore throat size. The biowaste material 20 passes into the lower horizontal bore 74 and into the porous strata or layer 86 where it produces gaseous material 22 that passes upwardly into the upper horizontal bore 72 and vents upwardly through the inner casing 76.

Figure 5:
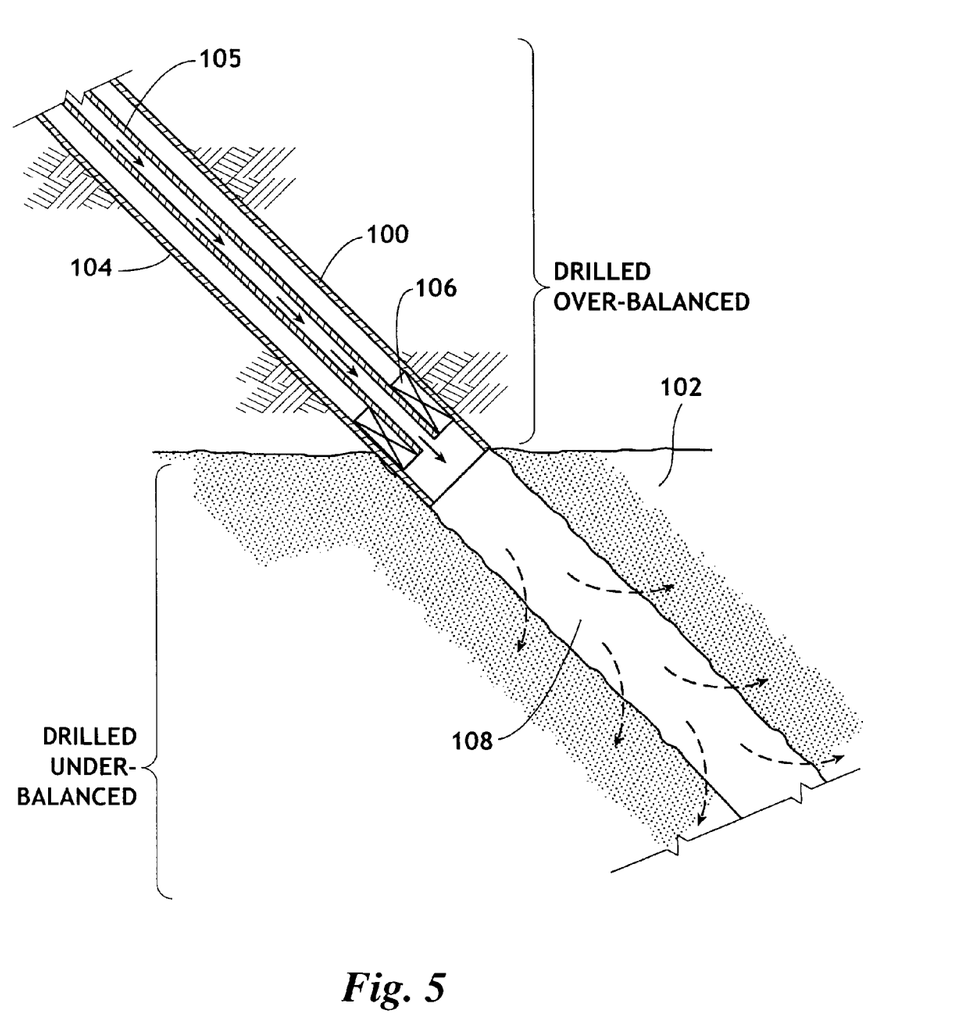
FIG. 5 is a view similar to FIG. 2 with the upper and lower portions of the well being inclined, the upper well portion having been drilled using overbalanced drilling conditions and the lower well portion, which extends into the porous layer, having been drilled using underbalanced drilling conditions.

FIG. 5 shows an embodiment of the present invention where the upper portion of the well and the lower portion are both inclined. The upper portion 100 of the well extends from ground level (not shown) to the beginning of the porous layer 102 and includes an outer casing 104 and an inner concentric casing 105 connected to the lower end of the outer casing by means of a packer 106. The upper portion 100 will have been drilled using overbalanced drilling conditions whereas the lower well bore 108 will have been drilled using underbalanced drilling conditions. The waste material introduced into the central bore 105 as indicated by the arrow will pass downwardly into the lower inclined well bore 108. As was the case with the other figures, a determination will have been made as to the pore size of the porous layer 102 so that the waste material (not shown) passing down through the inner casing 105 will have been comminuted previously to a size less than the pore size of the porous layer 102, as explained previosuly.

Figure 6:
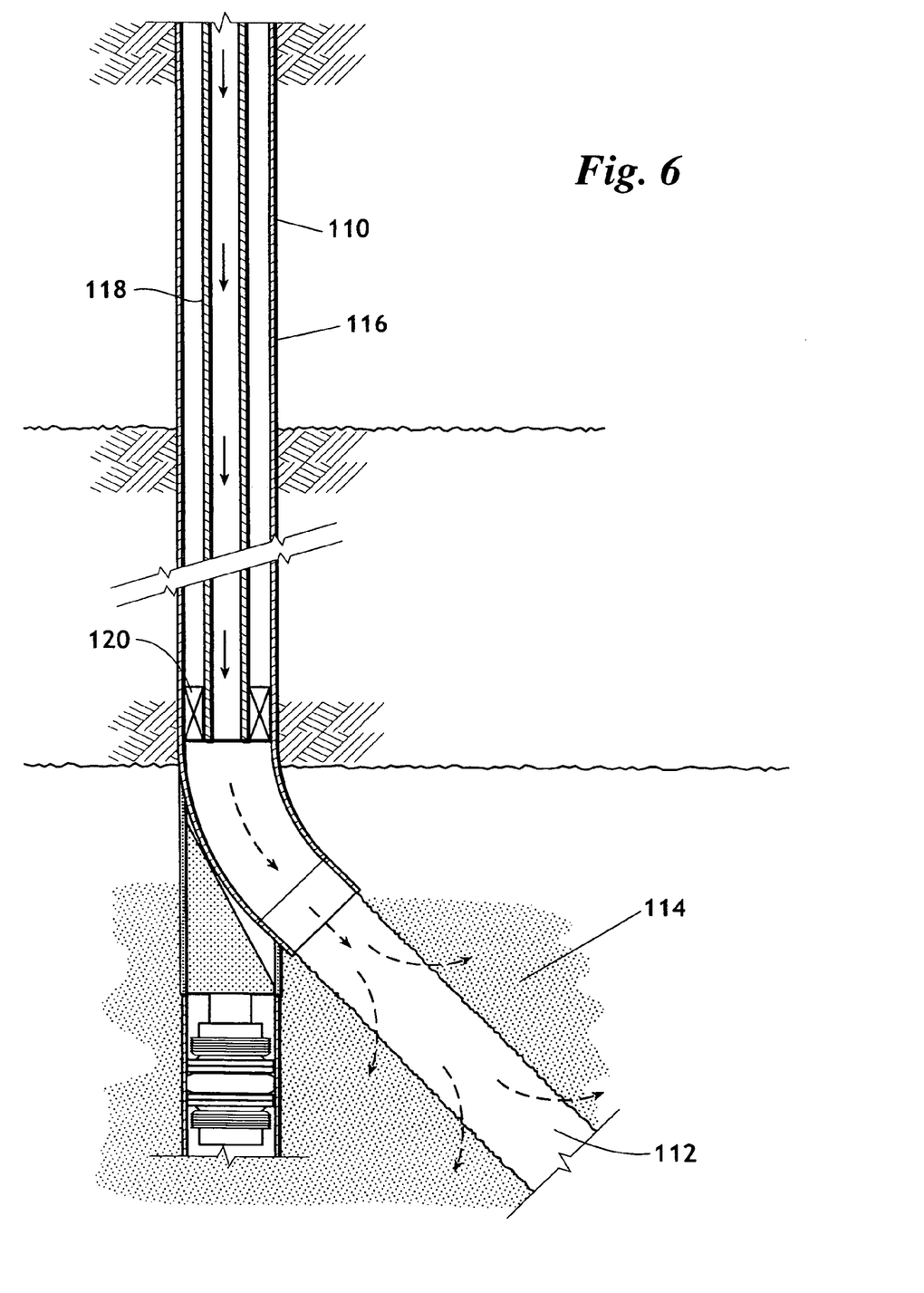
FIG. 6 is view similar to FIG. 3 with the upper portion of the well having been drilled using overbalanced drilling conditions and being vertical, the lower portion of the well being inclined from the upper portion and extending into the porous layer and having been drilled using underbalanced drilling conditions.

FIG. 6 is a further embodiment of the present invention wherein the upper portion of the well 110 is vertical and the lower portion is inclined as at 112. The upper portion will have been drilled using overbalanced drilling conditions and the lower inclined portion 112 will have been drilled using underbalanced drilling conditions. The lower portion 112 extends through the porous layer 114. The upper portion of the well 110 is provided with an outer casing 116 and an inner casing 118 which is separated at it lower end from the outer casing by means of the packer 120.

Again, as in the case of the other embodiments, the pore throat size and/or fracture aperture of the porous layer 114 will have been determined in advance using conventional techniques. It will be understood that the waste material passing down through the center of the inner casing 118 will have been comminuted previously to a degree less than the pore throat size of the material in the porous layers 114 so that the waste material can readily pass into the porous layer.

EXAMPLE ONE

Utilizing the arrangement shown in FIG. 4 of the drawing, it will be assumed that a geological sample has been obtained from the porous layer 86 and that the average pore throat size (and/or fracture aperture) of the porous layer is approximately 20 microns. As a result, the biowaste material coming down the pipe 88 and into the horizontal bore 74 will have been comminuted using a shear pump to an average particle size of about 10 microns. Under these conditions the material going into the horizontal bore 74 will penetrate into the porous layer 86 where it will decompose and pass as gas into horizontal bore 72 going out the conduit 76.

EXAMPLE TWO

Utilizing the arrangement shown in FIG. 4 of the drawing, it will be assumed that a geological sample has been obtained from the porous layer 86 and that the average pore throat size of the porous layer is approximately 20 microns. For the purpose of this example, the biowaste material coming down the pipe 88 and into the horizontal bore 74 will have been comminuted using a shear pump to an average particle size of about 3 microns. Under these conditions the material going into the horizontal bore 74 will penetrate into the porous layer 86 where it will decompose and pass as gas into horizontal bore 72 going out the conduit 76.

EXAMPLE THREE

Utilizing the construction shown in FIG. 4 as described above in Example One, it will be assumed that the geological sample from the porous layer 86 resulted in an average pore throat size of approximately 40 microns. For the purpose of this example, the biowaste material going down in the pipe 88 will have been comminuted to an average particle size of approximately 20 microns.

EXAMPLE FOUR

Utilizing the construction shown in FIG. 4 as described above in Example One, it will be assumed that the geological sample from the porous layer 86 resulted in an average pore throat size of approximately 40 microns. For the purposes of this example, the biowaste material going down in the pipe 88 will have been comminuted to an average particle size of approximately 6 microns.

Although FIGS. 1 and 4 are the only figures of the drawings that show both injection wells and production wells, it should be assumed that for the remaining figures, namely FIGS. 2, 3, 5 and 6 that similar production wells will have been drilled into the corresponding porous layers for the purpose of receiving the gases produced in the porous layer as a result of the comminuted waste material passing into the bores in those figures.

What is claimed is:

1. A method of treatment of biowaste material which comprises the step of introducing said biowaste material in comminuted form into an injection well which extends from a ground level to and into a porous layer under the surface of the ground, the injection being drilled in two sections, an upper section and a lower section, the upper section of the injection well being drilled using overbalanced drilling techniques, the lower section of the injection well being drilled using underbalanced drilling techniques, the step of making a prior geological measurement of the pore throat size of the material in the porous layer where the biowaste material is to be injected, and the further step of comminuting the waste material to a particle size small enough to be received into the porous layer prior to the injection thereof into the injection well.

2. A method of treatment of biowaste material as set forth in claim 1 which further comprises the step of drilling a production well from the ground level to and into the porous layer in spaced relation with respect to the injection well, the production well being drilled in two sections, an upper section and a lower section, the upper section of the production well being drilled from the ground level to the porous layer under overbalanced drilling conditions, the lower section of the production well being drilled from the lower end of the upper section of the production well to a location within the porous layer under underbalanced drilling conditions, allowing the material introduced into the porous layer from the lower section of the injection well to degrade into methane and other gases whereby the gaseous material can pass into the lower section of the production well and upwardly therefrom.

3. The method of treating biowaste material as set forth in claim 1 wherein the biowaste material introduced into the injection well has an average particle size ranging from about one-tenth to about one-half of the pore throat size of the porous layer.

4. The method of treating biowaste material as set forth in claim 3 wherein the biowaste material introduced into the injection well has an average particle size of about one-seventh of pore throat size of the porous layer.

5. The method of treating biowaste material as set forth in claim 1 wherein the lower section of the injection well is drilled at an angle with respect to the upper section thereof.

6. The method of treating biowaste material as set forth in claim 1 wherein the second section of the injection well is drilled horizontally.

7. The method of treating biowaste material as set forth in claim 2 wherein the second section of the production well is drilled horizontally.

* * * * *